April 20, 1954 C. W. HANSELL 2,676,301

PULSE TYPE MULTIPLEX COMMUNICATION SYSTEM

Original Filed May 28, 1949 2 Sheets-Sheet 1

INVENTOR
Clarence W. Hansell
BY
Charles H. Brown
ATTORNEY

INVENTOR
Clarence W. Hansell
BY
Charles H. Brown
ATTORNEY

Patented Apr. 20, 1954 2,676,301

UNITED STATES PATENT OFFICE 2,676,301

PULSE TYPE MULTIPLEX COMMUNICATION SYSTEM

Clarence W. Hansell, Port Jefferson, N. Y., assignor to Radio Corporation of America, a corporation of Delaware Application May 28, 1949, Serial No. 96,124, now Patent No. 2,640,921, dated June 2, 1953, which is a division of application Serial No. 495,181, July 17, 1943, now Patent No. 2,478,919, dated August 16, 1949. Divided and this application September 4, 1951, Serial No. 245,036

18 Claims. (Cl. 332—9)

Figure 1:
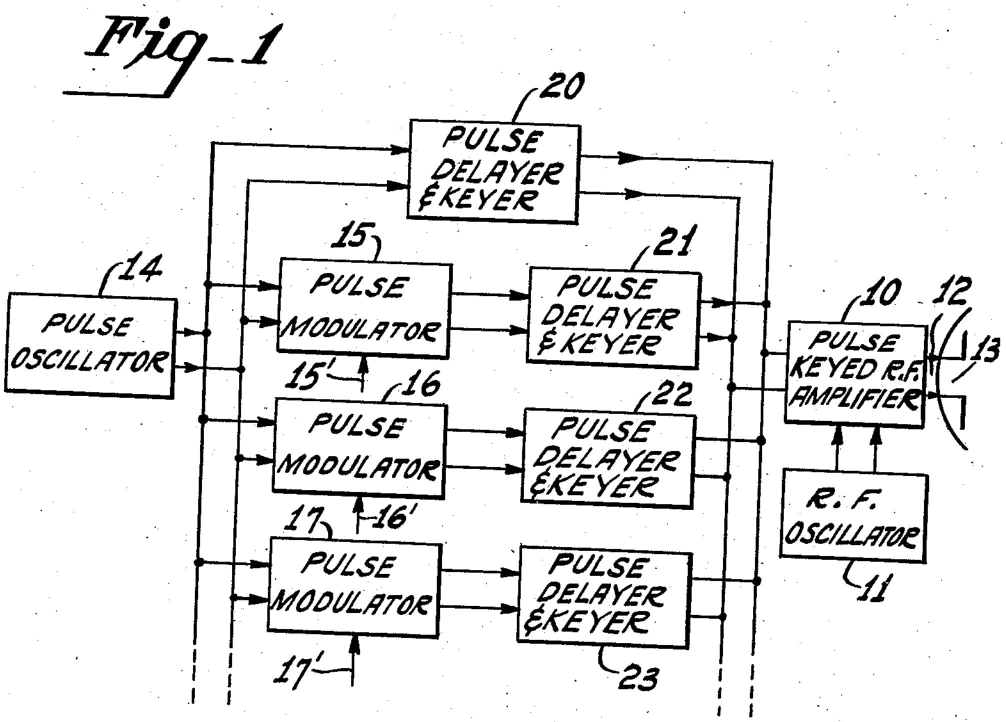

The invention relates to communication systems employing pulses of radio frequency energy which are short compared to the time intervals between them. It particularly pertains to pulse modulating circuits for multiplex system wherein a plurality of trains or groups of pulses are transmitted, each group bearing its own modulation in accordance with the particular message to be conveyed thereby.

This application is a division of U. S. application Serial No. 96,124, filed 28 May 1949, Patent No. 2,640,921, which was a division of U. S. application Serial No. 495,181, filed 17 July 1943, issued August 16, 1949, as U. S. Patent 2,478,919.

In copending application, Serial No. 371,865, filed December 27, 1940, now U. S. Patent 2,381,444, issued 7, August 1945, there is disclosed a pulse type communication system in which the receiver is rendered operative solely at time periods when the signal pulses are due to arrive. Such a receiver operated in this manner is preferably termed a "shuttered" or "gated" receiver.

The advantages of such a system are: (1) The peak power at the transmitter can be made to exceed considerably that which is obtainable in a continuous wave system, by virtue of the fact that the transmitted power is concentrated in the short pulses, and (2) that there is obtainable an increase in the signal-to-noise power compared to continuous wave systems, not only because of the increased transmitted power but also because the receiver is responsive only during time periods which may be occupied by the transmitted pulses, thus eliminating the effect of noise and interference occurring between pulses.

In accordance with the invention, there is provided a multiplex system wherein a multiplicity of transmitting channels are operated over a single transmitter to transmit non-overlapping pulses which are very short compared to the time intervals between them. The train or group of pulses from each transmitting station has its own modulation impressed thereon, and the pulses from all transmitting stations occupy only a small percentage of the total time for all conditions of modulation. The transmitter peak power is almost inversely proportional to the percentage of total time occupied by the pulses, and is thus high compared to known continuous wave systems. At the receiver, a synchronization system is employed to enable the different receivers or utilization circuits to be individually responsive at different times and solely at those times at which the signal pulses are due to arrive. Thresholding and limiting devices may be employed at the receiver to further reduce the noise. Thus, if there are continuous wave transmitters which might tend to interfere with the pulsing system of the invention, the output from the continuous wave transmitters must reach the receiver of the invention with greater strength to produce interference than with a continuous wave receiver. So long as the received strength of the continuous waves is less than the threshold value set at the receiver of the invention, the continuous waves will not interfere greatly with the operation of the present invention. Likewise, if the continuous waves do not modulate the signal current down to values below the limiting value they will not interfere greatly with the operation of the present invention. In general, so long as the peak amplitude of all noise and interference combined is less than half the peak amplitude of the pulse signal, a very great reduction in the effect of the combined noise and interference may be accomplished by the thresholding and limiting.

In accordance with the invention, all pulse transmitting stations of the multiplex system operate from a single transmitter and have the same pulse or repetition rate, although the different trains or groups of pulses from the stations occupy separate time periods. Each channel of the transmitter contains the necessary components for modulating the pulses in either time phase or width of the pulse in response to applied signal voltages. According to the invention a pulse delayer circuit is utilized to control the times at which the edges of the pulses are formed. In one arrangement the time displacement of both leading and trailing edges of the pulses are proportional to the applied modulating signal voltage and in the other the timing of the leading edge of the pulses is maintained at fixed rate while the timing of the trailing edges with respect to that of the leading edges is made proportional to the modulating signal voltages.

Figure 2:
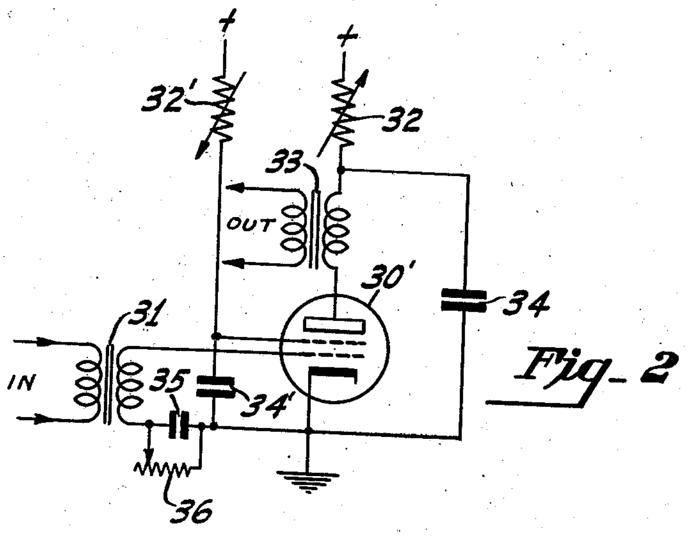
Figures 3, 4:
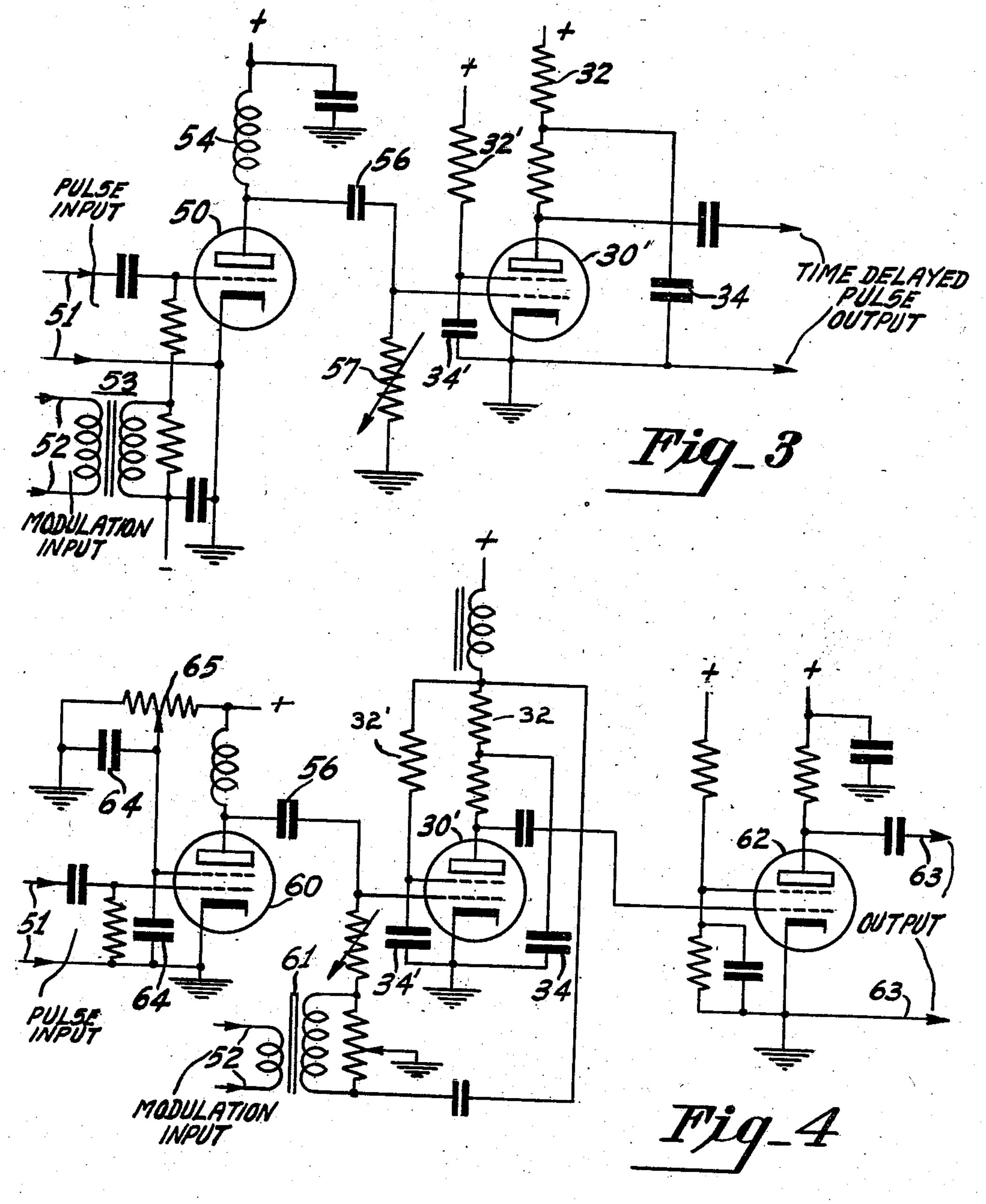

A more detailed description of the invention will now be given with reference to the accompanying drawing, forming a part of the specification and in which:

Fig. 1 schematically illustrates the transmitting end of a pulse type multiplex communication system, in accordance with the present invention;

Fig. 2 schematically illustrates details of a pulse delayer circuit which can be used in the transmitting system shown in Fig. 1 and which is used as a basis for explaining the operation of pulse width modulators according to the invention; and Figs. 3 and 4 schematically illustrate details of different types of pulse width modulation circuits which can be used in the transmitting system of Fig. 1.

Referring to Fig. 1, there is shown in block diagram a pulse type multiplex transmitter suitable for the transmission of pulses which are modulated in length or timing. This transmitter includes a pulse keyed radio frequency amplifier 10 which is supplied with radio frequency excitation from a constant frequency oscillator 11. Transmitter 10 is provided with vacuum tube keying equipment capable of causing the transmission of very short pulses in response to short input pulses. The output from the transmitter 10 passes over a suitable transmission line 12 to an antenna system 13, here shown, by way of example only, as a directive antenna in the form of a parabolic reflector having a dipole at its focus. A pulse oscillator 14 produces pulses at a constant rate, which pulses are short compared with the time spacing between them.

These pulses are repeated at a frequency above the highest modulation frequency, and are delivered to pulse modulators 15, 16, 17, etc. and to a pulse delayer 20. The pulse modulators 15, 16, and 17 have respectively impressed thereon modulation inputs from leads 15′, 16′ and 17′, in order that the outputs of these modulators consist of trains or groups of pulses suitably modulated in accordance with the intelligence to be conveyed on the different channels. The outputs from the pulse modulators 15, 16, 17, etc. are respectively deliverel to pulse delayers and keyers 21, 22, 23, and so on. These pulse delayers are adjusted for different delays in order to provide pulses which constitute the input to the transmitter or pulse keyed radio frequency amplifier 10. The pulses delivered to the transmitter 10 from the delayer circuits are preferably equally spaced in time, on the average, and recur at a pulsing rate equal to the rate of the pulse oscillator 14 multiplied by the number of pulse delayer modulators. Obviously, the pulse outputs from the different channels, each of which includes a pulse modulator and delayer circuit, are independently modulated for the transmission of independent programs or modulations.

The pulse delayer circuits 20, 21, 22, 23, and so on pass pulses at the same repetition rate as the pulse oscillator 14 but at different times. Thus, if the pulse modulator circuits modulate the length of the pulses, for example, the transmitter will send out constant frequency but variable length pulses separated in time. If, however, the pulse modulators modulate the timing of the pulses, the transmitter 10 will send out timing modulated pulses whose average frequency is the same but which are retarded or advanced in time by the modulation.

The pulses from each delayer circuit are short compared to the time intervals between them, in order that the pulses from all the channels occupy only a small percentage of the total time for all conditions of modulation. Thus, as an example, a 5 channel telephone multiplex system including a synchronizing channel might have a pulse rate in each channel of 10,000 per second, in which case the average spacing between centers of continued pulses will be 20 micro-seconds. The pulse length may be on the order of a half micro-second. For this example, it will be evident that the percentage of time occupied by all pulses in each cycle of operations for all conditions of modulation may be only 2.5 percent of the total elapsed time, as measured from the beginning of one pulse transmitted by the first channel to the beginning of the next pulse transmitted from the same channel in one complete cycle of operations. With this percentage of operating time the transmitter 10 can provide on the order of 40 times as much peak power as can be obtained from a continuous wave transmitter of equal size and cost.

It should be noted that the pulse oscillator 14 impresses its output directly upon the pulse delayer and keyer 20 without the intermediary of a pulse modulator circuit. This arrangement is preferred because it is desired that the pulses from the output of the pulse delayer 20 be the first one received at the receiver, and these pulses employed to synchronize or render operative the various receiving circuits solely at those time periods when the signal pulses for the respective channels are due to arrive. In view of the slight delay occasioned in the system of the invention in rendering the receiving circuits sequentially operative after the receipt of the first pulse, it is preferred that there be no modulation impressed on the synchronizing pulses, in accordance with the preferred embodiment of the present invention.

Referring to Fig. 2 in more detail, there is shown a tetrode vacuum tube 30′ to whose control grid is supplied an input pulse through a transformer 31. A positive polarizing potential is supplied to the anode of the vacuum tube through a variable resistor 32 and the primary winding of a transformer 33. A capacitor 34 is connected between the cathode of the tetrode and the junction between the resistor 32 and the primary winding of the transformer 33. In circuit with the cathode as shown, there is provided a capacitor 35 which is shunted by a resistor 36, the time constant of which network determines the time of delay. Resistor 36 is preferably adjustable in order to accurately set the delay desired between the input pulse and the output pulse. The time delayed output pulse is taken from the secondary winding of the transformer 33. Vacuum tube 30′ is so biased that it is normally conducting (that is, anode current flows in the absence of an input pulse). In this condition, a current will flow from the positive polarizing source through the resistor 32 and through the primary winding of transformer 33, thus shunting or by-passing capacitor 34. An incoming pulse applied to the transformer 31 will drive the grid of the tetrode momentarily positive to charge the capacitor 35, due to grid rectification, as a result of which a negative charge is placed on the grid of the tube 30′, thus biasing the tube to cut off. When the tube 30′ is non-conducting, current will flow from the positive anode polarizing source through the capacitor 34 to ground, and will thus charge the capacitor 34. When the charge on capacitor 35 leaks off through its shunt connected resistor 36, the grid will approach a state of zero potential relative to the cathode, at which time the tube 30′ will pass current, thus enabling the capacitor 34 to discharge across the tube. A pulse is thus passed through the transformer 33 whose time of occurrence is controlled by the adjustment of the grid resistor 36, the resistance value of the latter determining the length of time it takes for the charge on capacitor 35 to leak off. The rate of repetition of the pulses across the transformer 33 is, of course, determined by the repetition rate of the input pulses. The period of discharge of the capacitor 35 should be less than the time spacing between the incoming pulses, to which the output pulses are responsive, and should correspond to the relative time delay desired in pulse delayer and keyer units 20, 21, 22 and 23 of Fig. 1. A resistor 32' and a capacitor 34' are in the screen grid circuit of tube 30'. Both capacitors 34 and 34' charge and discharge simultaneously, thus providing a sharper output pulse from the transformer 33 than would be obtainable with a triode circuit which would not include capacitor 34. It should be noted that capacitors 34 and 34' are connected to the positive polarizing potential through separate resistors 32 and 32', respectively.

Fig. 3 shows a pulse modulation circuit which can be employed in the system of Fig. 1 for modulating the time of the pulses. This circuit includes a pulse delayer and pulse timing modulator. Referring to Fig. 3 in more detail, there is shown a triode vacuum tube 50 across whose grid and cathode are connected a circuit 51 which extends to the pulse oscillator 14 of Fig. 1, and also a modulation input circuit 52 which extends to the source of modulating potentials for impressing modulations on the pulses in accordance with the intelligence to be conveyed. The modulation input circuit 52 is connected to the grid and cathode of the triode 50 through an audio frequency transformer 53. In effect, the vacuum tube 50 is a pulse amplifier as well as a pulse modulator and a pulse limiter. The anode circuit of triode 50 includes an inductance 54 which stores energy therein, which energy is controlled by the tube anode current for delivery to the pulse delayer and pulse timing modulator vacuum tube 30'. The control grid of vacuum tube 30' is connected to the anode of the vacuum tube 50 through a capacitor 56. A capacitor 34 is connected between the cathode and anode of the pulse delayer 30', while a capacitor 34' is connected between the screen grid and cathode of tube 30' in substantially the same manner as the same numbered elements of Fig. 2. It should be noted that the capacitors 34 and 34' have individual resistors 32 and 32' connected between them and the positive anode polarizing potential. An adjustable resistor 57 is connected between the cathode and control grid of tube 30' for providing an adjustment of average pulse delay.

In the operation of the circuit shown in Fig. 3, the triode 50 is normally conductive and energy is stored in inductor 54. When a negative pulse from the oscillator 14 is applied to the circuit 51 and thence to the grid of the triode, the tube 50 will be cut off and a positive pulse applied to the control grid of the tetrode 30'. The tetrode 30' is normally conductive in the absence of pulses. The application of a positive pulse to the control grid of the tetrode 30' will cause grid rectification which will charge capacitor 56 negatively on the side adjacent the control grid of the tetrode 30'. The tube 30' is thus left in an anode current cut-off condition. During this condition, the capacitors 34 and 34' will be charged and both of these capacitors will discharge through the tube 30' when the negative charge on capacitor 56 leaks off. The operation of vacuum tube 30', it will thus be seen, is substantially similar to the operation of the arrangement shown in Fig. 2, previously described. For modulation purposes, the input to the triode 50 through circuit 52 and transformer 43 will vary the average bias of the triode amplifier and in this manner vary the energy stored in inductor L and the strength of the pulse delivered to the tetrode, as a result of which the peak charge on capacitor 56 will be varied in accordance with the modulation, thus varying the time delay of the output pulse relative to the input pulse. It should be noted that the energy stored in coil 54 is delivered to the delayer tube 30' at each pulse. The anode current in the tube 50 should, of course, reach a substantially steady state value before each pulse. If desired, there may be provided a feedback regenerative circuit in the tetrode circuit or in a later stage to sharpen the output pulse.

The system of Fig. 4 shows a pulse modulation circuit which may be used in the system of Fig. 1 for modulating the length or width of the pulses. This circuit shown in Fig. 4, like that shown in Fig. 3, includes both the pulse modulator and the pulse delayer. The elements appearing in Fig. 4 which correspond in function to those in Fig. 3 have been given the same reference numerals. In addition, the system of Fig. 4 includes a pulse peak limiter tube 62 which follows the pulse delayer and modulator 30' in order to convert variable amplitude pulses from the output of the delayer tube to variable length or variable width pulses. The pulse delayer and length modulator herein represented by vacuum tube tetrode 30', with its associated elements, is substantially the same as that shown in Fig. 3. It should be noted that in Fig. 4 the pulse input circuit 51 is applied between the grid and cathode of pulse amplifier tetrode vacuum tube 60. The screen grid and cathode of tube 60 are connected together through a by-pass capacitor 64, in turn shunting a portion of a potentiometer circuit 65. The modulation input circuit 52, however, is applied in Fig. 4 to a transformer 61, which is connected in such manner that the anode supply voltage of tetrode 30' is modulated in one sense while the control grid-cathode potential of tube 30' is modulated in an opposite sense for the purpose of balancing the effect of the modulation upon the time delay. Thus pulses of variable amplitude are obtained from the delayer tube 30', which after being limited in pulse peak limiter tube 62 appear as pulses of variable length or width in the output circuit 63. The pulse amplifier and limiter tube 60 is normally conductive in the absence of a negative input pulse from the oscillator 14 applied to circuit 51. The application of a negative pulse to the circuit 51 serves to cut off the anode current in tube 60 momentarily, as a result of which a positive pulse is delivered into the delayer tube 30' to produce grid rectification.

Details of multiplex receiving systems for use in receiving the multiplicity of short duration pulses of received energy sent out by the multiplex transmitter of Fig. 1 incorporating the circuit arrangements shown in Figs. 2, 3 and 4 may be had as reference to parent U. S. application Serial No. 495,181, filed July 17, 1943, and issued August 16, 1949, as U. S. Patent 2,478,919.

The invention claimed is:

1. A pulse delay circuit comprising an electric tube having a cathode, a signal grid, a further grid and an anode, an input circuit connected between said signal grid and said cathode, said input circuit including a capacitive element in series therewith, a resistor shunted across said signal grid and said cathode, a pair of resistors connected in series between said anode and the positive terminal of a source of unidirectional polarizing potential, the constants of said circuit being such that said tube normally passes anode current in the absence of a pulse applied to said input circuit, a capacitor connected between the junction of said pair of resistors and said cathode, a further capacitor connected between said cathode and said screen grid, and a resistive connection between said screen grid and the positive terminal of said source, whereby the application of a pulse to said input circuit charges said capacitive element to bias said tube to cut-off, thereby permitting a charge to build up on said capacitors, said capacitors discharging across said tube when the charge on said capacitive element leaks off, as a consequence of which an output pulse is produced at the anode of said tube.

2. A pulse translating circuit arrangement including an electron discharge system having at least a cathode, a control grid, a further grid and an anode, serially connected resistors connected to said anode, a capacitor connected between the junction of said serially connected resistors and said cathode, a resistance element connected to said further grid, a capacitive element connected between said further grid and said cathode, a resistive element coupled between said control grid and said cathode, the resistance value of said element determining the amount of delay between a pulse applied to said control grid and the appearance of a corresponding pulse at said anode, a pulse input circuit comprising an electron discharge device having cathode, control screen and anode electrodes, an inductor connected to the anode electrode to store energy therein in response to pulses applied to said control electrode, a capacitor inter-coupling said anode electrode and said control grid to apply pulses of energy to the latter in accordance with the energy stored in said inductor.

3. A pulse modulator circuit arrangement including an electron discharge system having at least a cathode, a control grid, a further grid and an anode, serially connected resistors connected to said anode, a capacitor connected between the junction of said serially connected resistors and said cathode, a resistance element connected to said further grid, a capacitive element connected between said further grid and said cathode, a resistive element coupled between said control grid and said cathode, the resistance value of said element determining the amount of delay between the pulse applied to said control grid and the appearance of a corresponding pulse at said anode, a pulse input circuit comprising an electron discharge device having cathode, control screen and anode electrodes, an inductor connected to the anode electrode to store energy therein in response to pulses applied to said control electrode, a capacitor inter-coupling said anode electrode and said control grid of said electrode discharge system to apply pulses of energy to the latter in accordance with the energy stored in said inductor, a bias circuit connected to said control electrode of said electrode discharge device, and an element interposed in said bias circuit to apply modulating potentials to said control electrode to vary the amount of energy stored in said inductor in accordance with the applied modulating potential, thereby to produce a pulse at said anode of said electron discharge system varying in time with respect to the pulse applied to said grid electrode of said electron discharge device.

4. A pulse delay circuit comprising an electric tube having a cathode, a signal grid, a further grid and an anode, an input circuit connected between said signal grid and said cathode, said input circuit including a capacitive element in series therewith, a variable resistor shunted across said signal grid and said cathode, a pair of resistors connected in series between said anode and the positive terminal of a source of unidirectional polarizing potential, the contants of said circuit being such that said tube normally passes anode current in the absence of a pulse applied to said input circuit, a capacitor connected between the junction of said pair of resistors and said cathode, a further capacitor connected between said cathode and said further grid, and a resistive connection between said further grid and the positive terminal of said source, whereby the application of a pulse to said input circuit charges said capacitive element to bias said tube to cut-off, thereby permitting a charge to build up on said capacitors, said capacitors discharging across said tube when the charge on said capacitive element leaks off, as a consequence of which an output pulse is produced at the anode of said tube, the amount of delay between said input and said output pulse being adjusted by operation of said variable resistor.

5. A pulse energy translating circuit comprising a vacuum tube having anode, cathode, signal grid and further grid electrodes, a capacitor connected between the further grid and the cathode, a direct connection from said cathode to a point of reference potential, a pair of serially arranged resistors connected between said anode and a source of unidirectional potential, a capacitor connected between the junction point of said pair of impedances and said cathode, a circuit including a series capacitor and a variable shunt resistor for applying input pulses between said control grid and cathode, an output circuit coupled to said anode for deriving time delayed pulses, and means to apply modulating potentials to said input circuit to vary the energy of said pulses in accordance with the modulating potential.

6. A pulse translating circuit including a controlled electron flow system having at least two electrodes defining an electron path the first one of said electrodes being an output electrode, and the second being connected to a point of fixed potential and a third electrode associated with said two electrodes to control the flow of electrons in said path, an output load impedance element connected to said output electrode, a storage capacitor coupled in series circuit relationship with said load impedance element and said electron flow paths, a pulse input circuit having a series capacitor therein and a resistive element coupled between said third electrode and said point of fixed reference potential, said circuit having constants at which the electron flow in said system is of one nature, whereby the application of a pulse to said input circuit renders the electron flow of opposite nature to charge said storage capacitor and said series capacitor, said storage capacitor discharging over said electron path when the charge on said series capacitor leaks off thereby producing an output pulse at said load impedance element, and a modulation input circuit separate and apart from said pulse input circuit and coupled across at least part of said resistive element to apply modulating potentials to vary the time of charge and discharge of said storage capacitor in accordance with the amplitude of said modulating potentials.

7. A pulse time modulating circuit including a controlled electron flow system having at least two electrodes defining an electron path the first one of said electrodes being an output electrode, and the second being connected to a point of fixed potential and a third electrode associated with said two electrodes to control the flow of electrons in said path, an output load impedance element connected to said output electrode, a storage capacitor coupled in series circuit relationship said load impedance element and said electron flow paths, a pulse input circuit having a series capacitor and a shunt resistor therein coupled between said third electrode and said point of fixed reference potential, said circuit having constants at which the electron flow in said system is of one nature, whereby the application of a pulse to said input circuit renders the electron flow of opposite nature to charge said storage capacitor and said series capacitor, said storage capacitor discharging over said electron path when the charge on said series capacitor leaks off thereby producing an output pulse at said load impedance element, a controlled electron flow device having at least two electrodes defining an electron path and a further electrode associated with said two electrodes to control the flow of electrons in said path, said device being coupled to said pulse input circuit, an inductor coupled to said device to store energy under control of pulses applied to said further electrode, and means to apply modulating potential to said further electrode to vary the energy stored in said inductor to vary the charge and discharge of said storage capacitor in accordance with the amplitude of said modulating potential.

8. A pulse delay and modulator circuit comprising an electron discharge device having a cathode, a signal grid, a further grid, and an anode, an input circuit connected between said signal grid and said cathode, said input circuit including a capacitor connected in series therewith and a shunt resistor, a pair of resistors connected in series between said anode and the positive terminal of a source of unidirectional polarizing potential, the constants of said circuit being such that said tube normally passes anode current in the absence of a pulse applied to said input circuit, a further capacitor connected between said cathode and said further grid, and a resistive connection between said further grid and the positive terminal of said source, another capacitor connected between said cathode and the junction of said serially connected resistor, whereby the application of a pulse to said input circuit charges said first capacitor to bias said tube to cut-off, thereby permitting charges to build up on both of said second and third capacitors, said last capacitors discharging through said tube when the charge on the first capacitor leaks off, as a consequence of which an output pulse is produced at said anode, and means to apply modulating potentials to said input circuit to vary the constants of said circuit, thereby to vary the time delay between the application of a pulse to the input circuit and the production of the corresponding output pulse at said anode.

9. A pulse delay and modulator circuit comprising an electron discharge device having a cathode, a signal grid, a further grid, and an anode, an input circuit connected between said signal grid and said cathode, said input circuit including a capacitor connected in series therewith and a shunt resistor, a pair of resistors connected in series between said anode and the positive terminal of a source of unidirectional polarizing potential, the constants of said circuit being such that said tube normally passes anode current in the absence of a pulse applied to said input circuit, a further capacitor connected between said cathode and said further grid, and a resistive connection between said further grid and the positive terminal of said source, another capacitor connected between said cathode and the junction of said serially connected resistor, whereby the application of a pulse to said input circuit charges said first capacitor to bias said tube to cut-off, thereby permitting charges to build up on both said second and third capacitors, said last capacitors discharging through said tube when the charge on the first capacitor leaks off, as a consequence of which an output pulse is produced at said anode, and means to apply modulating potentials to said input circuit to vary the constants of said circuit, thereby to vary the time delay between the application of a pulse to the input circuit and the prdouction of the corresponding output pulse at said anode and the amplitude of said pulses, and a pulse peak limiter circuit coupled to said anode to vary the width of said output pulse in proportion to the amplitude thereof, said circuit comprising an electron discharge structure having cathode, signal, further and anode electrodes, resistors connecting said source of unidirectional polarizing potential to said anode and further electrodes, a resistor and a capacitor connected in parallel between said further and said cathode electrodes, and a capacitor coupling said signal electrode to the anode of said electron discharge device.

10. A pulse delay circuit comprising an electric tube having a cathode, a signal grid, a further grid and an anode, an input circuit connected between said signal grid and said cathode, said input circuit including a capacitive element in series therewith, a grid resistor and a tapped resistor connected in series and shunted across said signal grid and said cathode with the tap of the latter connected to said cathode, a pair of resistors connected in series between said anode and the positive terminal of a source of unidirectional polarizing potential, the constants of said circuit being such that said tube normally passes anode current in the absence of a pulse applied to said input circuit, a capacitor connected between the junction of said pair of resistors and said cathode, a further capacitor connected between said cathode and said screen grid, and a resistive connection between said screen grid and the positive terminal of said source, whereby the application of a pulse to said input circuit charges said capacitive element to bias said tube to cut-off, thereby permitting a charge to build up on said capacitors, said capacitors discharging across said tube when the charge on said capacitive element leaks off, as a consequence of which an output pulse is produced at the anode of said tube, a transformer having the secondary winding thereof connected across said tapped resistor, and a capacitor coupling the end of said tapped resistor remote from said grid resistor to the end of said series connected resistors remote from said anode.

11. A pulse modulator circuit arrangement having input and output circuits and including an electron discharge system having cathode, grid, input control and output anode electrodes, and electrode intercoupling capacitors and resistors arranged to produce a pulse in said output circuit in response to a pulse applied to said input circuit, means to modify said pulses, said means including means to derive modulating voltages of opposite sense, means to apply one of said modulating voltages to said input circuit, and means to apply the other of said modulating voltages to said output circuit whereby the effect of said modulation voltages on the timing of said output pulses is substantially balanced.

12. A pulse regenerating circuit having input and output terminals, an output pulse being produced at said output terminals in response to a pulse applied to said input terminals, means to apply modulating potentials to said pulse regenerating circuit to modify said output pulse with respect to said applied pulse, said means comprising means to derive modulating currents of opposite sense, means to apply one of said modulating currents in one portion of said pulse regenerating circuit, and means to apply the other of said modulating currents to another portion of said circuit whereby any deleterious effects of said modulating potentials on the regeneration of said pulse is substantially eliminated.

13. A pulse modulator circuit arrangement having input and output circuits and including an electron discharge system having cathode, grid, input control and output anode electrodes, and electrode intercoupling capacitors and resistors arranged to produce a pulse in said output circuit in response to a pulse applied to said input circuit, means to modify said pulses, said means including means to derive modulating voltages of opposite sense, means to apply one of said modulating voltages to said input circuit, and means to apply the other of said modulating voltages to said output circuit, said modulating voltages having amplitudes differing in proportion to the voltage levels of said input and said output circuits, whereby the individual effects of said modulation voltages on the timing of said output pulses is substantially balanced.

14. A pulse width modulation circuit including an electron discharge system having at least cathode, control, and anode electrodes, said cathode being at a point of fixed reference potential, an output load impedance element connected to said anode electrode, a storage capacitor connected to said cathode electrode and to said load impedance element remote from said anode electrode, a control capacitor coupled to said control electrode, an electron discharge system for applying pulses to said circuit between said control capacitor and said point of fixed reference potential, a resistance element coupled at one end to said control electrode, a modulation potential winding, means connected to said winding to divide the potential existing thereacross into two parts of opposing sense with respect to said point of fixed reference potential, means interconnecting one terminal of said winding and the other end of said resistance element to apply one part of said modulation potential in one sense to the control electrode of said electron discharge system and means interconnecting the other terminal of said winding to said anode electrode to apply the part of said modulation potential of opposite sense to said electron discharge system.

15. A pulse regenerating circuit arrangement including at least an electron discharge system having at least cathode, grid, and anode electrodes, input terminals coupled to said grid and output terminals coupled to said anode, said regenerating circuit being arranged to produce a pulse in said output circuit in response to a pulse applied to said input circuit, and means to modify said pulses, said means including a transformer having a secondary circuit arranged to derive modulating voltages of opposite sense, a connection between one end of said secondary circuit arrangement and said grid to apply one of said modulating voltages to said input circuit, and connections including a capacitor intercoupling the other end of said secondary circuit arrangement and said anode to apply the other of said modulating voltages thereto, whereby the effect of said modulation voltages on the timing of said output pulses is substantially balanced.

16. A pulse regenerating circuit having at least one electron discharge device having a cathode, a grid and an anode, input terminals coupled to said grid and output terminals coupled to said anode, an output pulse being produced at said output terminals in response to a pulse applied to said input terminals, means to apply modulating potentials to said pulse regenerating circuit to modify said output pulse with respect to said applied pulse, said means comprising a transformer having a secondary circuit arranged to derive modulating currents of opposite sense, a resistor coupling one end of said secondary circuit to said grid to apply one of said modulating currents thereto, and a connection between the other end of said secondary circuit to apply the other of said modulating currents to another portion of said circuit, whereby any deleterious effects of said modulating potentials on the regeneration of said pulse is substantially eliminated.

17. A pulse modulator circuit arrangement including an electron discharge device having at least cathode, anode and control electrodes, means to apply a train of pulses to be modulated to the cathode and control electrodes, an inductor connected in series with the cathode-anode electrode path of said device and a source of operating potential, an electron discharge system having at least a cathode, a control grid, a further grid and an anode, a pair of serially connected resistors connected in series with the cathode-anode paths of said electron discharge system and said source of operating potential, a capacitor connected between the junction of said serially connected resistors and said cathode, a resistive element connecting said source of operating potential to said further grid, a capacitive element connected between said further grid and said cathode, a capacitive component coupling the anode electrode of said electron discharge device to the control grid of said electron discharge system, a resistive component coupled between the control grid and the cathode of said electron discharge system, the resistance value of said component determining the time delay between application of pulses to said grid electrode of said electron discharge device and the production of corresponding pulses at the anode of said electron discharge system, a resistive element coupled between the control electrode and the cathode electrode of said electron discharge device, and a transformer coupled across at least a part of said resistive element for applying modulating potential to said electron discharge device to vary the bias thereon and produce a phase shift of pulses at the anode of said electron discharge system proportional to the modulating potential applied to said electron discharge device.

18. A pulse modulator circuit arrangement including an electron discharge device having at least cathode, anode and control electrodes, means to apply a train of pulses to be modulated to the cathode and control electrodes, an inductor connected in series with the cathode-anode electrode path of said device and a source of operating potential, an electron discharge system having at least a cathode, a control grid, a further grid and an anode, a pair of serially connected resistors connected in series with the cathode-anode paths of said electron discharge system and a source of operating potential, a capacitor connected between the junction of said serially connected resistors and said cathode, a resistive element connecting a positive source of potential to said further grid, a capacitive element connected between said further grid and said cathode, a capacitive component coupling the anode electrode of said electron discharge device to the control grid of said electron discharge system, a resistive component coupled between the control grid and the cathode of said electron discharge system, the resistance value of said component determining the time delay between application of pulses to said grid electrode of said electron discharge device and the production of corresponding pulses at the anode of said electron discharge system, a resistive element coupled between the control electrode and the cathode electrode of said electron discharge device, and a transformer coupled across at least a part of said resistive element for applying modulating potential to said electron discharge device to vary the bias thereon and produce a phase shift of pulses at the anode of said electron discharge system proportional to the modulating potential applied to said electron discharge device.

References Cited in the file of this patent

UNITED STATES PATENTS

| Number | Name | Date |
|---|---|---|
| 2,478,919 | Hansell | Aug. 16, 1949 |
| 2,568,099 | Townsley | Sept. 18, 1951 |